(12) United States Patent
Otsuka et al.

(10) Patent No.: US 10,758,959 B2
(45) Date of Patent: Sep. 1, 2020

(54) PANEL-LIKE FORMED PRODUCT AND MANUFACTURING METHOD THEREOF

(71) Applicant: NIPPON STEEL & SUMITOMO METAL CORPORATION, Tokyo (JP)

(72) Inventors: Kenichiro Otsuka, Tokyo (JP); Yoshiaki Nakazawa, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 348 days.

(21) Appl. No.: 15/756,668

(22) PCT Filed: Sep. 14, 2016

(86) PCT No.: PCT/JP2016/077027
§ 371 (c)(1),
(2) Date: Mar. 1, 2018

(87) PCT Pub. No.: WO2017/047601
PCT Pub. Date: Mar. 23, 2017

(65) Prior Publication Data
US 2018/0264535 A1    Sep. 20, 2018

(30) Foreign Application Priority Data
Sep. 18, 2015  (JP) ................. 2015-185026

(51) Int. Cl.
B21D 22/26    (2006.01)
B60J 5/04    (2006.01)
(Continued)

(52) U.S. Cl.
CPC ............. B21D 22/26 (2013.01); B21D 19/08 (2013.01); B21D 22/208 (2013.01); B21D 22/22 (2013.01);
(Continued)

(58) Field of Classification Search
CPC ........ B21D 22/02; B21D 22/06; B21D 22/20; B21D 22/208; B21D 22/22; B21D 22/26;
(Continued)

(56) References Cited

U.S. PATENT DOCUMENTS 6,830,419 B1 * 12/2004 Turner .................. B21D 51/38
413/56
7,490,503 B1 * 2/2009 Kanemitsu ............. B21D 53/18
72/348
(Continued)

FOREIGN PATENT DOCUMENTS

JP    61-97323    6/1986
JP    S6197323    *  6/1986 ............. B21D 24/00
(Continued)

*Primary Examiner* — Adam J Eiseman
*Assistant Examiner* — Bobby Yeonjin Kim
(74) *Attorney, Agent, or Firm* — Clark & Brody LP

(57) ABSTRACT

A manufacturing method includes a preparing step, an intermediate pressing step, a heating step, and a hot stamping step. In the preparing step, a blank is prepared. In the intermediate pressing step, press working is applied to the blank to produce an intermediate formed product. In the heating step, the intermediate formed product is heated. In the hot stamping step, press working is applied to the intermediate formed product to produce a panel-like formed product. In the hot stamping step, a machine including a first die, a second die, a punch, and a blank holder is used. While the intermediate formed product is pinched between the first die and the punch, the second die and the blank holder are moved relative to the first die and the punch, and thereby, the panel-like formed product is produced.

6 Claims, 13 Drawing Sheets

(51) Int. Cl.
  *B60J 5/00* (2006.01)
  *B21D 22/22* (2006.01)
  *B21D 22/20* (2006.01)
  *B21D 35/00* (2006.01)
  *B21D 19/08* (2006.01)
  *B21D 24/04* (2006.01)
  *B21D 53/88* (2006.01)

(52) U.S. Cl.
  CPC ............ *B21D 24/04* (2013.01); *B21D 35/00* (2013.01); *B21D 35/005* (2013.01); *B60J 5/00* (2013.01); *B60J 5/04* (2013.01); *B60J 5/0413* (2013.01); *B21D 53/88* (2013.01)

(58) Field of Classification Search
  CPC ........ B21D 22/30; B21D 24/04; B21D 24/10; B21D 22/022; B21D 22/2221; B21D 22/2222
  USPC ................... 72/348, 381–383, 396, 399, 400
  See application file for complete search history.

(56) References Cited

U.S. PATENT DOCUMENTS

| | | | | |
|---|---|---|---|---|
| 8,261,591 | B2* | 9/2012 | Hielscher | B21D 24/16 72/334 |
| 2002/0148272 | A1* | 10/2002 | Jroski | B21D 22/20 72/347 |
| 2010/0269962 | A1* | 10/2010 | Im | C21D 7/02 148/645 |
| 2012/0067098 | A1* | 3/2012 | Chien | B21D 22/22 72/294 |
| 2012/0266644 | A1* | 10/2012 | Blei | B21D 51/2638 72/349 |
| 2012/0297853 | A1* | 11/2012 | Tanaka | B21D 22/02 72/350 |
| 2013/0213109 | A1* | 8/2013 | Ogasawara | B21D 11/20 72/379.2 |
| 2014/0096583 | A1* | 4/2014 | Cho | B21D 22/022 72/332 |
| 2014/0356643 | A1* | 12/2014 | Nakata | B21D 24/06 428/603 |
| 2015/0209840 | A1* | 7/2015 | Koyer | C21D 9/0056 72/40 |
| 2015/0231688 | A1* | 8/2015 | Yamagata | B21D 22/22 72/347 |
| 2015/0354035 | A1* | 12/2015 | Mizuta | C22C 38/001 148/504 |
| 2016/0059295 | A1* | 3/2016 | Frost | B21D 35/003 72/354.6 |
| 2016/0121384 | A1* | 5/2016 | Sumikawa | B21D 22/26 72/352 |
| 2020/0078849 | A1* | 3/2020 | Marx | B21D 22/30 |

FOREIGN PATENT DOCUMENTS

| | | |
|---|---|---|
| JP | 02-93021 | 7/1990 |
| JP | 2002-143937 | 5/2002 |
| JP | 2008-201377 | 9/2008 |
| JP | 2010-149184 | 7/2010 |
| JP | 2010-527407 | 8/2010 |
| KR | 2014-0059223 | 5/2014 |
| WO | 2014/059298 | 4/2014 |
| WO | 2014/084151 | 6/2014 |
| WO | 2015/008495 | 1/2015 |

* cited by examiner

PANEL-LIKE FORMED PRODUCT AND MANUFACTURING METHOD THEREOF

TECHNICAL FIELD

The present invention relates to a panel-like formed product formed from a steel plate by hot stamping, and a manufacturing method thereof. More specifically, the present invention relates to a panel-like formed product suited to be used as a door inner panel for an automobile, and a manufacturing method thereof.

BACKGROUND ART

A door of an automobile is produced by fitting a door inner panel, a door outer panel and the like together. A widow, a window drive device, an audio speaker, a handle and the like are to be attached to the door of an automobile. For set-in of these components, a space must be made between the door inner panel and the door outer panel. In order to make the space, for example, vertical walls are made in the door inner panel. Also, when the door is closed, the inside of the automobile must be sealed by the door. In order to seal the inside of the automobile, a stair is made in the door inner panel. The stair of the vertical walls is caused to face a pillar and the like, and thereby, the inside of the automobile can be sealed tighter.

A door inner panel used for an automobile side door or the like is produced by press working of a steel plate. Such a door inner panel generally has a complicated shape. Accordingly, in producing such a door inner panel, it is necessary to deform a steel plate largely. In this case, the door inner panel after the press working may have cracks, wrinkles and the like. Especially in a case of production of the door inner panel with a stair and adjacent vertical walls, the door inner panel after the press working is likely to have cracks, wrinkles and the like.

In order to avoid the problem, typically, a highly workable steel plate is used as the material (blank) for such a door inner panel. A highly workable steel plate is highly ductile, and thereby, even when the highly workable steel plate is deformed, cracks, wrinkles and the like are unlikely to occur. As another measurement to avoid the problem, hot stamping is adopted to production of a door inner panel. In hot stamping, a material is heated and pressed. The workability of the material is heightened by heat, and the door inner panel after the press working is unlikely to have cracks, wrinkles and the like.

Methods for manufacturing a panel-like formed product including a door inner panel are disclosed in WO 2014/084151 (Patent Literature 1) and Japanese Patent Application Publication 2010-149184 (Patent Literature 2).

A panel-like formed product manufacturing method disclosed in Patent Literature 1 includes a vertical wall forming step and a flange forming step. In the vertical wall forming step, a blank is pressed with a punch and a die, and the vertical walls are wholly formed. In the flange forming step after the vertical wall forming step, while the vertical walls are caught between the punch and the die, the top board is pinched between a pad and a punch, and thereby, a flange is formed. Patent Literature 1 states as follows. In the vertical wall forming step, the ends of the blank are not tied down, and therefore, the vertical walls are unlikely to spring back. In the flange forming step, the top board and the vertical walls are tied down by the die, and therefore, the flange can be formed with high accuracy.

In a panel-like formed product manufacturing method disclosed in Patent Literature 2, vertical walls are formed by hot stamping while a portion of a blank to be formed into a top board is pinched between a pad and punch. When press working is applied to the blank, the ends of the blank do not make contact with the die, and therefore, the ends of the blank are not quenched. Patent Literature 2 states that this method reduces the risk of causing cracks in the end portions of the pressed product.

CITATION LIST

Patent Literatures

Patent Literature 1: WO 2014/084151
Patent Literature 2: Japanese Patent Application Publication No. 2010-149184

SUMMARY OF INVENTION

Technical Problems

When a product having a difficult-to-form shape is manufactured in either the method disclosed in Patent Literature 1 or the method disclosed in Patent Literature 2, the product is likely to have cracks, wrinkles and the like. The product with a difficult-to-form shape means a panel-like formed product having a stair and adjacent vertical walls, for example.

An object of the present invention is to provide a high-strength panel-like formed product with fewer cracks, wrinkles and other defects even when it has a difficult-to-form shape, and a manufacturing method thereof.

Solutions to Problems

A method for manufacturing a panel-like formed product according to an embodiment of the present invention is used to produce a panel-like formed product including a top board and vertical walls. The top board is polygonal. The vertical walls extend from two or more sides of the top board, and the vertical walls include at least two adjacent vertical walls extending from at least two adjacent sides of the top board. Two or more adjacent ones of the vertical walls are divided by a stair extending therethrough into a first vertical wall section connecting an inner edge of the stair and the top board, and a second vertical wall section connecting an outer edge of the stair.

The manufacturing method according to the embodiment includes a preparing step, an intermediate pressing step, a heating step, and a hot stamping step. In the preparing step, a steel plate is prepared as a blank. In an intermediate pressing step, cold or hot press working is applied to the blank to produce an intermediate formed product wherein the top board has been formed, and the first vertical wall section of the vertical walls has been formed to a height of the step. In the heating step, the intermediate formed product is heated. In the hot stamping step, hot stamping is applied to the heated intermediate formed product by use of a hot stamping machine to produce the panel-like formed product.

The hot stamping machine includes a first die, a second die, a punch, and a blank holder. The first die has an engraved portion corresponding to a shape of the top board and a shape of a portion from the top board to the outer edge of the stair. The second die is disposed outside the first die. The punch faces the first die and has an engraved portion corresponding to the shape of the top board and the shape of the portion from the top board to the outer edge of the stair. The blank holder faces the second die. The hot stamping step includes a first step and a second step. In the first step, the intermediate formed product is placed on the punch, and the intermediate formed product is pinched between the first die and the punch and pinched between the second die and the blank holder. In the second step, the second die and the blank holder are moved relative to the first die and the punch while the intermediate formed product is kept pinched between the first die and the punch. In this way, the panel-like formed product is completely produced. In the first step, the blank holder does not make contact with the intermediate formed product until the first and the second dies make contact with the intermediate formed product.

A panel-like formed product according to an embodiment of the present invention is made of a steel plate and having a tensile strength of 1200 MPa or more. The panel-like formed product includes a polygonal top board, and two or more vertical walls extending from two or more sides of the top board, the vertical walls including at least two adjacent vertical walls extending from at least two adjacent sides of the top board. Two or more adjacent ones of the vertical walls are divided by a stair extending therethrough.

Advantageous Effects of Invention

The panel-like formed product according to the embodiment has few cracks, wrinkles and other defects and has high strength even though it has a difficult-to-form shape. This panel-like formed product can be produced by the panel-like formed product manufacturing method according to the embodiment of the present invention.

DESCRIPTION OF EMBODIMENTS

Figure 1:
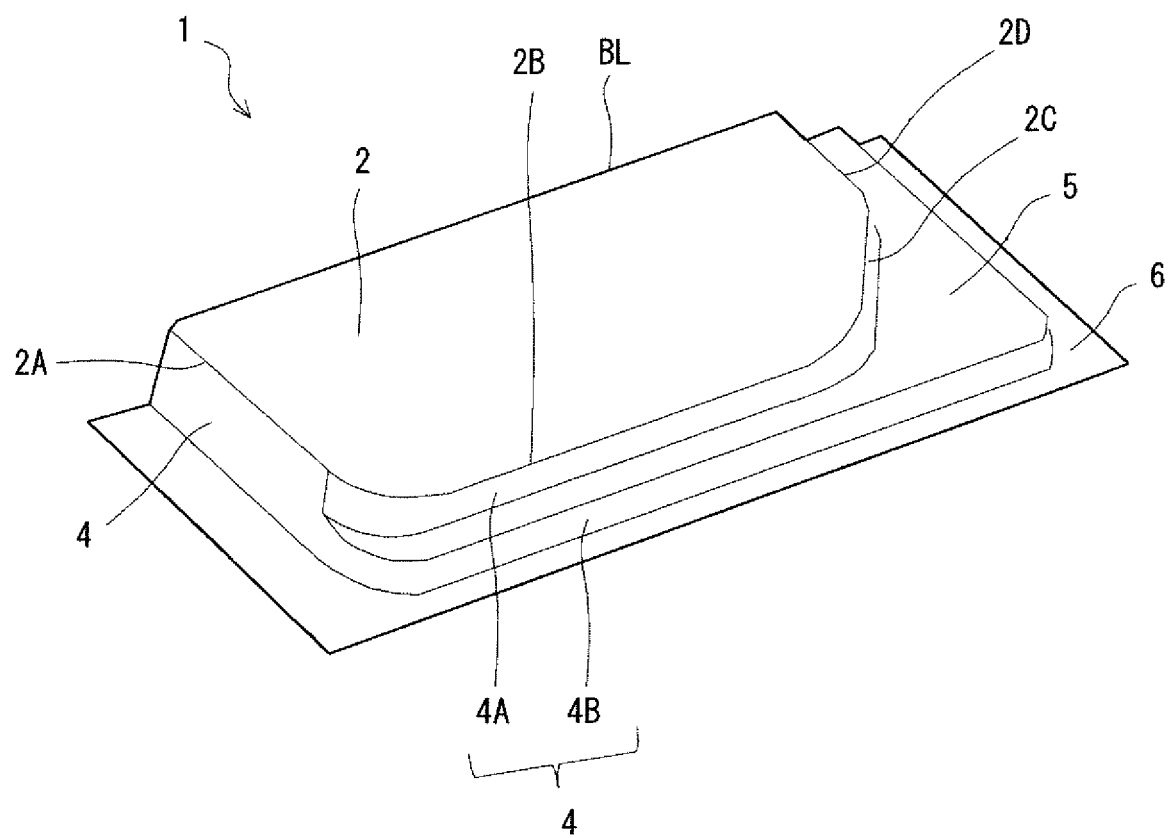
FIG. 1 is a perspective view of a door inner panel produced by a manufacturing method according to a first embodiment.

A method for manufacturing a panel-like product according to an embodiment of the present invention is applied to production of a panel-like formed product including a top board and a plurality of vertical walls. The top board is polygonal. The vertical walls extend from two or more sides of the top board, and the vertical walls include at least two adjacent vertical walls extending from at least two adjacent sides of the top board. At least two or more adjacent vertical walls are divided by a stair extending therethrough into a first vertical wall section connecting an inner edge of the stair and the top board, and a second vertical wall section connecting an outer edge of the stair.

The manufacturing method according to the embodiment includes a preparing step, an intermediate pressing step, a heating step, and a hot stamping step. In the preparing step, a steel plate is prepared as a blank. In the intermediate pressing step, cold or hot press working is applied to the blank. Thereby, an intermediate product wherein the top board has been formed, and the first vertical wall section of the vertical walls has been formed to a height of the stair is produced. In the heating step, the intermediate formed product is heated. In the hot stamping step, press working is applied to the heated intermediate formed product by use of a hot stamping machine. Thereby, a panel-like formed product is produced.

In this description, the term "hot stamping" means working as follows. A heated material (a blank or an intermediate formed product) is formed by press working. During the forming of the material, the material is cooled rapidly by contact with a cooled punch, a cooled die and the like, and thereby quenched. This transforms the metal structure into martensite and allows the formed product to have high strength. Thus, hot stamping is different from conventional warm forming.

The hot stamping machine includes a first die, a second die, a punch and a blank holder. The first die has an engraved portion corresponding to a shape of the top board and a shape of a portion from the top board to the outer edge of the stair. The second die is disposed outside the first die. The punch faces the first die and has an engraved portion corresponding to the shape of the top board and the shape of the portion from the top board to the outer edge of the stair. The blank holder faces the second die. The hot stamping step includes a first step and a second step. In first step, the intermediate formed product is placed on the punch, and the intermediate formed product is pinched between the first die and the punch and pinched between the second die and the blank holder. In the second step, the second die and the blank holder are moved relative to the first die and the punch while the intermediate formed product is kept pinched between the first die and the punch. Thereby, a panel-like formed product is produced. In the first step, the blank holder does not make contact with the intermediate formed product until the first and the second dies make contact with the intermediate formed product.

The panel-like formed product manufacturing method according to the embodiment allows production of a panel-like formed product with a difficult-to-form shape while reducing the risk of causing cracks, wrinkles and other defects. The difficult-to-form shape is, for example, the shape of the panel-like formed product wherein adjacent vertical walls are divided by a stair.

In the first step, preferably, an end surface of the blank holder is initially at a height lower than a stair surface of the punch corresponding to the stair. This ensures non-contact between the blank holder and the intermediate formed product at the early stage of the hot stamping step.

The manufacturing method above can be modified in the way (1) or (2) below.

(1) The panel-like formed product has a recess in the top board. In the intermediate pressing step, a raised portion is formed on the top board of the intermediate formed product, at a place corresponding to the location of the recess of the top board of the panel-like formed product. The first die of the hot stamping machine has an opening at a place corresponding to the raised portion of the intermediate formed product. The second die of the hot stamping machine has a projection at a place corresponding to the opening of the first die. In the second step of the hot stamping step, the raised portion of the intermediate formed product is pressed by the projection and thereby formed into the recess of the panel-like formed product.

(2) The panel-like formed product has a projection on the top board. In the intermediate pressing step, a recessed portion is formed in the top board of the intermediate formed product, at a place corresponding to the location of the projection of the top board of the panel-like formed product. The punch of the hot stamping machine has an opening at a place corresponding to the recessed portion of the intermediate formed product, and a projection at a place corresponding to the opening. In the second step of the hot stamping step, the recessed portion of the intermediate formed product is pressed by the projection and thereby formed into the projection of the panel-like formed product.

In this way, even in manufacturing a panel-like formed product which has a recess or a projection in or on the top board, it is possible to reduce the risk of causing cracks, wrinkles and the like.

The panel-like formed product after the hot stamping step preferably has a tensile strength of 1200 MPa or more. In this case, the panel-like formed product is suited for use as a door inner panel for an automobile. Also, the blank may be a tailored blank. This allows an improvement of the collisional property of the door inner panel and weight reduction of the door inner panel.

The panel-like formed product manufactured by the above-described manufacturing method is formed from a steel plate, and has a tensile strength of 1200 MPa or more. The panel-like formed product includes a polygonal top board, and two or more vertical walls extending from two or more sides of the top board, the vertical walls including at least two adjacent vertical walls extending from at least two adjacent sides of the top board. Two or more adjacent ones of the vertical walls are divided by a stair extending therethrough.

The panel-like formed product can be used as a door inner panel for an automobile. In this case, none of the vertical walls extends from the upper side of the top board defining the upper side of the body of the automobile.

The door inner panel preferably has a recess in the top board. In this case, the recess functions as a door impact beam. The recess may be replaced with a projection.

In the door inner panel, the recess or the projection is preferably disposed in an upper portion of the top board including the upper side of the top board defining the upper side of the body of the automobile such that the recess or the projection extends along the upper side of the top board. In this case, the recess or the projection extending along the upper side functions as a belt line reinforcement.

Some embodiment of the present invention will hereinafter be described in reference to the drawings. In the drawings, the same or corresponding parts are provided with the same reference symbols, and the same descriptions of these parts will not be repeated. In the embodiments below, door inner panels for automobiles will be described as examples of panel-like formed products.

First Embodiment

[Formed Product]

FIG. 1 is a perspective view of a door inner panel manufactured by a manufacturing method according to a first embodiment. In reference to FIG. 1, the door inner panel 1 includes a top board 2, vertical walls 4, and a stair 5. The top board 2 is polygonal. The top board 2 may be quadrangle or pentagonal, for example. In this description, "polygonal" means having a polygonal shape including a case having round (for example, arc-like) corners (vertexes). FIG. 1 shows an example having a pentagonal top board 2. In the door inner panel 1, one side of the top board 2 defines a belt line BL.

The vertical walls 4 extend from at least two sides of the top board 2. In the example shown in FIG. 1, the vertical walls 4 extend from four sides 2A, 2B, 2C and 2D of the pentagonal top board 2. However, the number of sides from which the vertical walls 4 extend is not limited to four. It is only necessary that the vertical walls 4 include vertical walls extending from two or more adjacent sides of the top board 2. When there are vertical walls 4 extending from two or more adjacent sides of the top board 2, these vertical walls 4 extending from the adjacent sides are adjacent to each other. In the example shown in FIG. 1, the vertical walls 4 extend perpendicularly to the top board 2. However, the vertical walls 4 do not need to be exactly perpendicular to the top board 2.

The stair 5 extends through some adjacent ones of the vertical walls 4 and divides these vertical walls 4 into an upper vertical wall section (which will hereinafter be referred to also as a "first vertical wall section") 4A near the top board 2, and a lower vertical wall section (which will hereinafter be referred to also as a "second vertical wall section") 4B. The first vertical wall section 4A connects the inner edge of the stair 5 and the top board 2. The second vertical wall section 4B connects the outer edge of the stair 5. The stair 5 extends outward from the first vertical wall section 4A. The outer edge of the stair 5 connects the second vertical wall section 4B. In the example shown in FIG. 1, the surface of the stair 5 is parallel to the top board 2. However, the surface of the stair 5 does not need to be exactly parallel to the top board 2. The bottom end of the second vertical wall 4B connects a flange 6. In the example shown in FIG. 1, the stair 5 is formed to extend through three adjacent vertical walls 4. The number of the vertical walls 4 through which the stair 5 extends is not limited to three. It is only necessary that the stair 5 extends through two or more adjacent vertical walls 4. In other words, the stair 5 extends through at least two adjacent ones of the vertical walls 4. In the example shown in FIG. 1, only one stair 5 extends the adjacent vertical walls 4. However, the number of stairs 5 is not limited to one. Two or more stairs 5 may extend through the adjacent vertical walls 4.

Typically, the door inner panel 1 has the following dimensions.

Entire length (including the flange 6): 800 to 1300 mm
Entire width (including the flange 6): 600 to 800 mm
Entire length of the top board: 700 to 1200 mm
Entire width of the top board: 500 to 700 mm
Height of the first vertical wall section: 30 to 100 mm
Height of the second vertical wall section: 30 to 100 mm
Minimum width of the stair: 20 to 40 mm
Plate thickness: 0.5 to 1.8 mm When a panel-like formed product has a plurality of vertical walls extending from sides of a top board and when a stair extends through at least two adjacent ones of the vertical walls, the panel-like formed product is difficult to form. Therefore, during press working for production of the panel-like formed product, cracks, wrinkles and other defects are likely to occur. Conventionally, when working is applied to produce a formed product with a complicated shape, a high-ductility low-strength steel plate is used as the blank, and the blank is pressed. Accordingly, the collisional property of the formed product is low. The panel-like formed product manufacturing method according to the embodiment allows production of a panel-like formed product with a difficult-to-form shape while reducing the risk of causing cracks, wrinkles and other defects. The method according to the present embodiment also allows production of a high-strength formed product with a tensile strength of 1200 MPa or more.

When such a high-strength panel-like formed product is employed in an automobile as a door inner panel, the collision property of the door is improved. Specifically, it is preferred that the panel-like formed product has a hardness of not less than HV380. The hardness of HV380 is equivalent to a tensile strength of 1200 MPa. Therefore, a door inner panel having a harness of HV380 has a high collisional property. The Vickers hardness HV is measured in conformity with JIS Z 2244 (2009).

Typically, the panel-like formed product contains, at mass %, C: 0.11 to 0.50%, Si: 0.15 to 0.25%, and Mn: 0.08 to 1.50%, and the balance includes Fe and impurities. The panel-like formed product may contain either B: 0.0020 to 0.0030% or Cr: 0.15 to 0.25%, or may contain both of them, as arbitrary elements. The above-described panel-like formed product is quenched by hot stamping and has a metal structure of martensite. However, any steel plate having a composition other than the above-described composition also can be used as long as a martensite structure can be obtained from the steel plate after hot stamping.

[Manufacturing Method]

A manufacturing method according to a first embodiment includes a preparing step, an intermediate pressing step, a heating step and a hot stamping step. After an intermediate formed product is produced by the intermediate pressing step, the intermediate formed product is subjected to hot stamping and thereby is formed into a door inner panel.

Figure 2A:
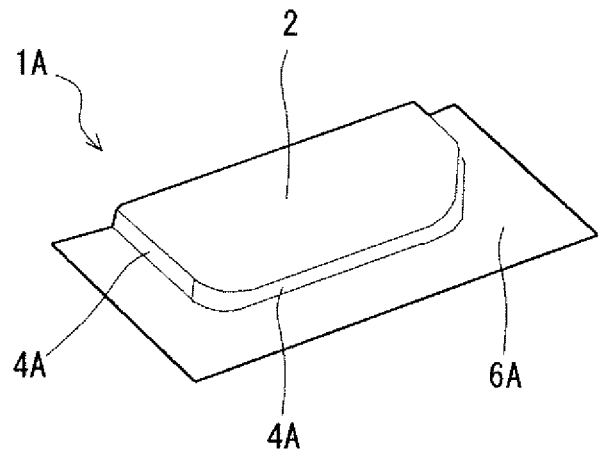
FIG. 2A is a perspective view showing a state after an intermediate pressing step.
Figure 2B:
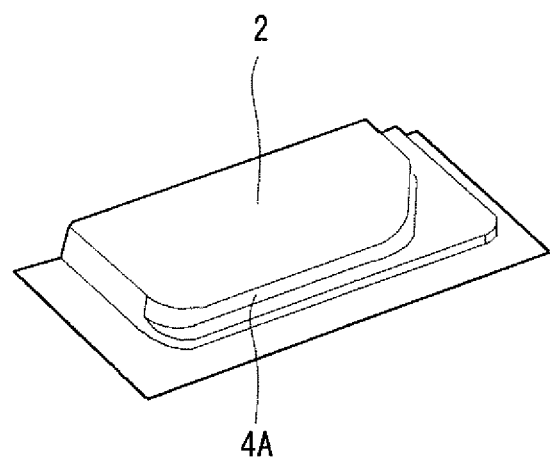
FIG. 2B is a perspective view showing a state during a hot stamping step.
Figure 2C:
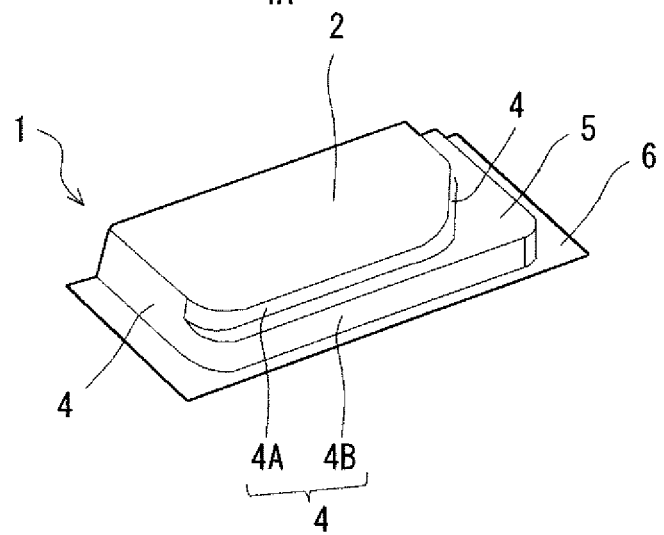
FIG. 2C is a perspective view showing a state after the hot stamping step.

FIGS. 2A to 2C show a manufacturing process of a door inner panel produced by the method according to the first embodiment. FIG. 2A shows a state after the intermediate pressing step. FIG. 2B shows a state during the hot stamping step. FIG. 2C shows a state after the hot stamping step. In reference to FIGS. 2A to 2C, the steps will hereafter be described.

[Preparing Step]

In the preparing step, a blank plate, for example, a steel plate having the above-described composition is prepared. The quality of the steel plate as the blank does not matter, as long as the steel plate can be transformed into martensite by quenching through hot stamping. For example, for production of a door inner panel as in the present embodiment, the steel plate preferably contains carbon (C) at not less than 0.11 mass %. Generally, when the steel plate contains carbon at not less than 0.11%, the door inner panel after hot stamping can have a high strength. In this description, the "steel plate" includes a surface-treated steel plate (for example, a galvanized steel plate).

[Intermediate Pressing Step]

In the intermediate pressing step, cold or hot pressing is applied to the blank, and thereby, an intermediate formed product is obtained. In this step, the blank may be cold-drawn by use of a standard pressing machine, or the blank may be heated and formed by hot stamping.

As shown in FIG. 2A, by the intermediate pressing step, an intermediate formed product 1A including a top board 2, a first vertical wall section 4A, and a flange 6A is obtained. The flange 6A includes a portion to be formed into the stair 5 of the door inner panel 1, and the flange 6A extends outward largely in a plane. The flange 6A is formed into the stair 5, a second vertical wall section 4B and a flange 6 (see FIG. 2C) in the following steps. Thus, in the intermediate pressing step, the vertical walls 4 are formed to the height of the stair 5 (see FIG. 2C).

Figure 3:
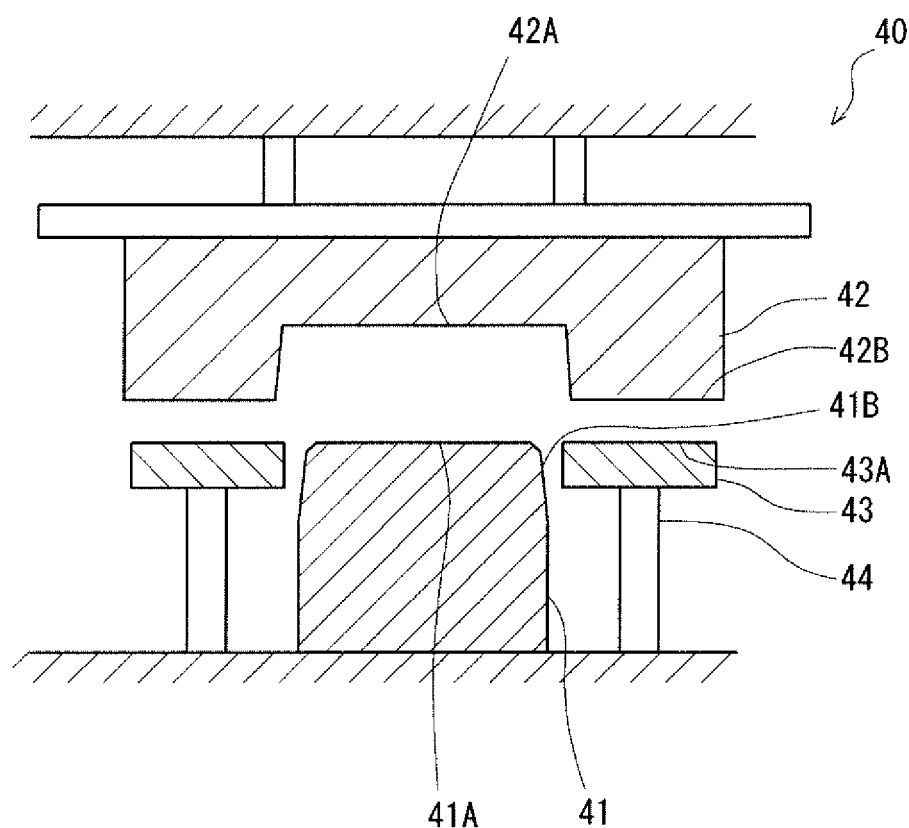
FIG. 3 is a sectional view schematically showing a machine used to implement the intermediate pressing step in the first embodiment.

FIG. 3 is a sectional view schematically showing a machine used in the intermediate pressing step in the first embodiment. In reference to FIG. 3, the pressing machine 40 includes a punch 41, a die 42, and a blank holder 43. In the present embodiment, the punch 41 and the blank holder 43 are located below, and the die 42 is located above. The blank holder 43 is disposed outside and adjacent to the punch 41. The die 42 is disposed to face the punch 41 and the blank holder 43, and the die 42 is paired with the punch 41 and the blank holder 43.

The punch 41 has an end surface 41A and side surfaces 41B. The punch 41 is fixed on a base of the machine. The end surface 41A has an engraved portion corresponding to the shape of the top board 2 of the door inner panel 1. The side surfaces 41B have engraved portions corresponding to the shape of the first vertical wall section 4A. The height from the bottoms of the side surfaces 41B to the end surface 41A is equal to the height from the stair 5 to the top board 2 of the door inner panel 1.

The blank holder 43 has an end surface 43A. The end surface 43A has an engraved portion corresponding to the shape of the stair 5. The end surface 43A extends outward beyond the area of the stair 5. The blank holder 43 is supported by the base of the machine via an elastic member 44. The elastic member 44 is a spring, a hydraulic cylinder or an air cylinder, for example. The end surface 43A of the blank holder 43 is initially located at almost the same height as the end surface 41A of the punch 41.

The die 42 has a die bottom surface 42A and an end surface 42B. The die 42 is fixed to a ram of the machine. The die bottom surface 42A faces the end surface 41A of the punch 41. The die bottom surface 42A has an engraved portion corresponding to the shape of the top board of the door inner panel. The end surface 42B of the die 42 faces the end surface 43A of the blank holder 43. The end surface 42B of the die 42 has an engraved portion corresponding to the shape of the stair 5 of the door inner panel 1. The end surface 42B extends outward largely beyond the area of the stair 5 of the door inner panel 1. The height (depth) from the end surface 42B to the die bottom surface 42A is equal to the height from the stair 5 to the top board 2 of the door inner panel 1.

In the above-described pressing machine 40 used in the intermediate pressing step in the present embodiment, the punch 41 and the blank holder 43 are located below, and the die 42 is located above. However, the locations of these components are not limited to the case shown in FIG. 3. The locations of the punch 41 and the blank holder 43 and the location of the die 42 may be reversed up and down.

Figure 4A:
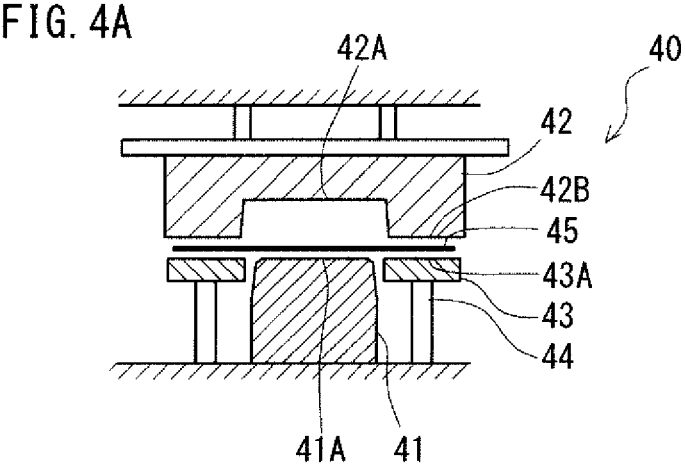
FIG. 4A is a sectional view showing a stage where an intermediate formed product in the first embodiment has been set in a hot stamping machine.
Figure 4B:
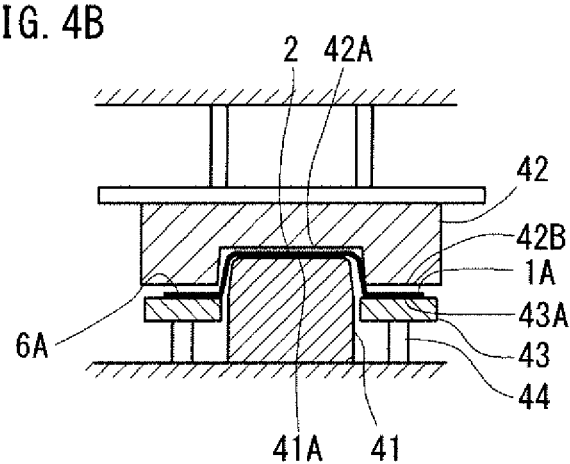
FIG. 4B is a sectional view showing a stage where a downward movement of a die has been completed (the die has reached the bottom dead point).

FIGS. 4A and 4B are sectional views schematically showing the intermediate pressing step in the first embodiment. FIG. 4A shows a stage where the blank has been set in the pressing machine. FIG. 4B shows a stage where a downward movement of the die has been completed (the die has reached the bottom dead point).

As shown in FIG. 4A, the blank 45 is set in the pressing machine 45. Specifically, the blank 45 is placed on the punch 41. Thereafter, as the ram of the machine is moving down, the die 42 moves down. Then, the die 42 makes contact with the blank 45. Thereby, the blank 45 is pinched between the end surface 42B of the die 42 and the end surface 43A of the blank holder 43, and forming with the die 42 and the punch 41 starts. As shown in FIG. 4B, the die 42 moves down to the bottom dead point. Thereby, an intermediate formed product 1A is obtained. Thus, with the die bottom surface 42A of the die 42 and the end surface 41A of the punch 41, the top board 2 of the door inner panel 1 shown in FIG. 1 is formed. With the end surface 42B of the die 42 and the end surface 43A of the blank holder 43, the flange 6A including a portion to be formed into the stair 5 of the door inner panel 1 shown in FIG. 1 is formed.

While the blank 45 is pinched between the die 42 and the blank holder 45, the gap between the end surface 42B of the die 42 and the end surface 43A of the blank holder 43 is preferably kept at the plate thickness of the blank 45 plus about 0.1 mm (for example, 0.05 to 0.3 mm). This can be realized in the following structure, for example. A spacer (not shown) is attached to the edge of the end surface 43A of the blank holder 43. The spacer has a thickness of the plate thickness of the blank 45 plus about 0.1 mm (for example, 0.05 to 0.3 mm), and the spacer contacts the edge of the end surface 42B of the die 42. In this structure, the blank 45 is pinched between the die 42 and the blank holder 43 loosely.

[Heating Step]

Figure 5:
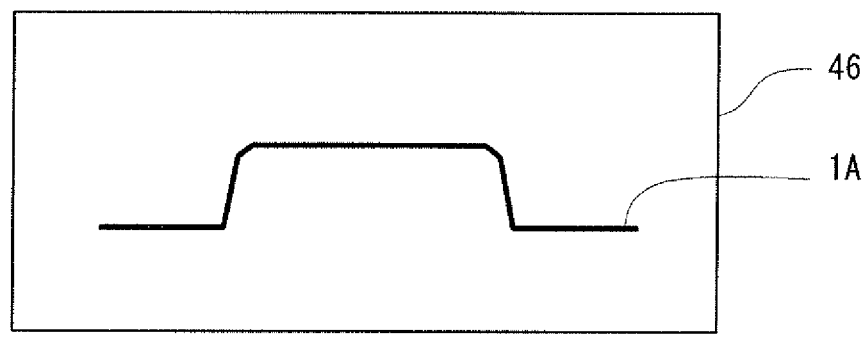
FIG. 5 is a sectional view schematically showing a machine used to implement a heating step in the first embodiment.

In the heating step, the intermediate formed product 1A is heated by a heating device. For example, as shown in FIG. 5, the intermediate formed product 1A is put in a batch-type heating furnace 46 and heated. It is preferred that the intermediate formed product 1A is heated to a temperature not lower than the A1 transformation point of the material thereof. For example, the heating temperature is preferably 700° C. or more. More specifically, the heating temperature is 900° C. In the next hot stamping step, the intermediate formed product 1A is to be quenched while being pressed. Therefore, by heating the material to a temperature not lower than the A1 transformation point in the heating step, the metal structure after the quenching will be martensite. Thus, the formed door inner panel will have high strength. It is more desirable that the material is heated to a temperature not lower than the A3 transformation point. The heating temperature is set appropriately according to the material, the degree of difficulty of forming, and the like.

[Hot Stamping Step]

Figure 6:
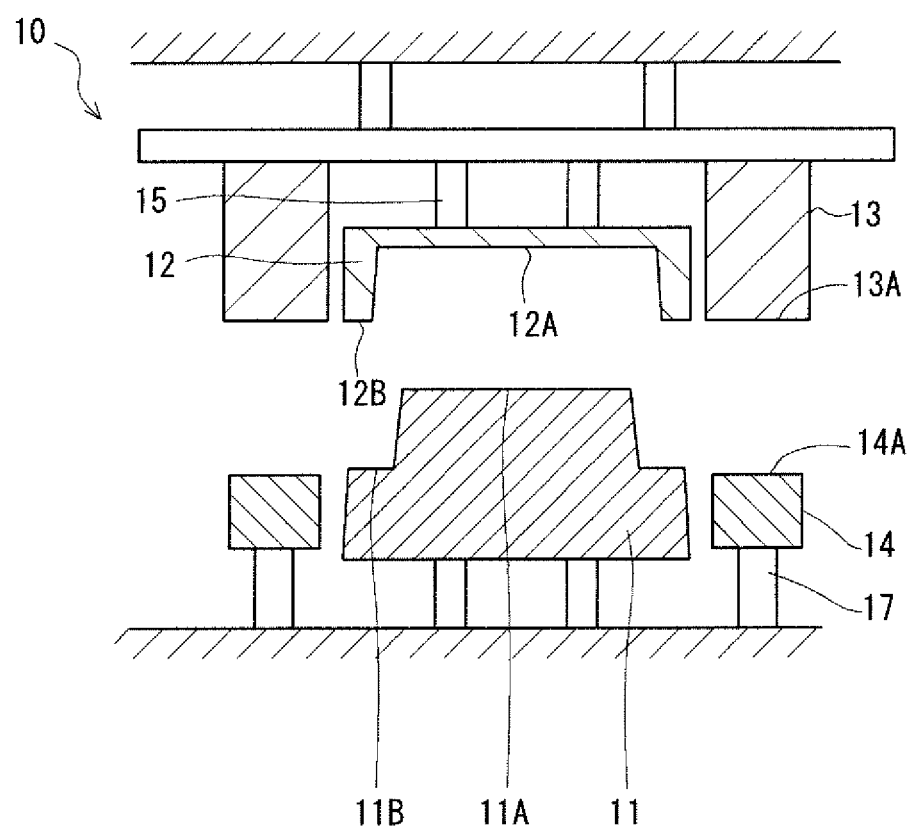
FIG. 6 is a sectional view schematically showing a hot stamping machine to implement the hot stamping step.

FIG. 6 is a sectional view schematically showing a machine used in the hot stamping step in the first embodiment. In reference to FIG. 6, the hot stamping machine 10 includes a punch 11, a first die 12, a second die 13, and a blank holder 14. In the present embodiment, the punch 11 and the blank holder 14 are located below, and the first die 12 and the second die 13 are located above. The blank holder 14 is disposed outside and adjacent to the punch 11. The second die 13 is disposed outside and adjacent to the first die 12. The first die 12 is disposed to face the punch 11, and the first die 12 is paired with the punch 11. The second die 13 is disposed to face the blank holder 13, and the second die 13 is paired with the blank holder 14.

The punch 11 includes an end surface 11A and a stair surface 11B. The punch 11 is fixed on a base of the machine. The end surface 11A has an engraved portion corresponding to the shape of the top board 2. The stair surface 11B has an engraved portion corresponding to the shape of the stair 5 of the door inner panel 1. The height from the stair surface 11B to the end surface 11A is equal to the height from the stair 5 to the top board 2 of the door inner panel 1.

The blank holder 14 includes an end surface 14A. The end surface 14A of the blank holder 14 faces a reference surface 13A of the second die 13. The blank holder 14 is supported by the base of the machine via an elastic member 17. The elastic member 17 is a spring, a hydraulic cylinder, or an air cylinder, for example. The end surface 14A of the blank holder 14 is initially located at a height slightly lower than the height of the stair surface 11B. The height difference is about 1 to 5 mm. If the height difference is less than 1 mm, the gap between the blank holder 14 and the intermediate formed product at the early stage of the forming by hot stamping will be too small. Then, the temperature of the intermediate formed product will drop before the second die 13 makes contact with the intermediate formed product, and cracks will be likely to occur. If the height difference is over 5 mm, the gap between the blank holder 14 and the intermediate formed product at the early stage of the forming by hot stamping will be too large. Then, the period from the time when the second die 13 makes contact with the intermediate formed product till the time when the intermediate product is pinched between the second die 13 and the blank holder 14 will be too long, and wrinkles will be likely to occur.

The first die 12 includes a die bottom surface 12A and an end surface 12B. The die bottom surface 12A faces the end surface 11A of the punch 11. The die bottom surface 12A has an engraved portion corresponding to the shape of the top board 2 of the door inner panel 1. The end surface 12B of the first die 12 faces the stair surface 11B of the punch 11. The end surface 12B has an engraved portion corresponding to the shape of the stair 5 of the door inner panel 1. The height (depth) from the end surface 12B to the die bottom surface 12A is equal to the height from the stair 5 to the top board 2 of the door inner panel 1. The first die 12 is supported by a ram of the machine via an elastic member 15. The elastic member is a spring, a hydraulic cylinder or an air cylinder, for example.

The second die 13 includes a reference surface 13A. The reference surface 13A faces the end surface 14A of the blank holder 14. The second die 13 is fixed to the ram of the machine. The ram of the machine is movable up and down.

In the hot stamping machine 10 according to the present embodiment, the punch 11 and the blank holder 14 are located below, and the first die 12 and the second die 13 are located above. However, the locations of these components are not limited to the case shown in FIG. 6. The locations of the punch 11 and the blank holder 14 and the locations of the first die 12 and the second die 13 may be reversed up and down. In sum, the machine is only required to have a structure where the punch 11 and the blank holder 14 are movable relative to the first die 12 and the second die 13.

Figure 7A:
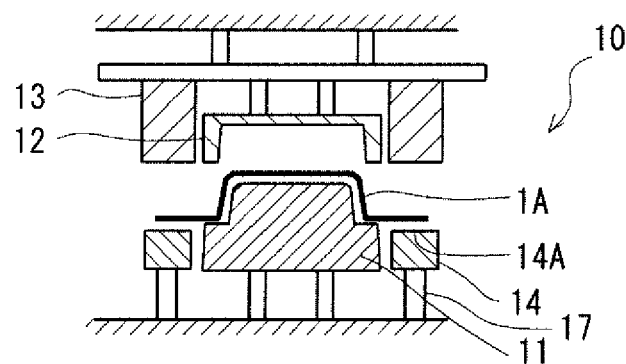
FIG. 7A is a sectional view showing a stage where an intermediate formed product in the first embodiment has been set in the hot stamping machine.
Figure 7B:
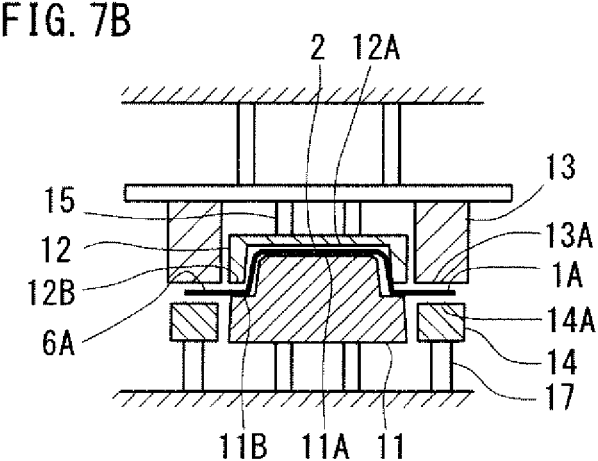
FIG. 7B is a sectional view showing a stage where the intermediate formed product has been pinched between a first die and a punch.
Figure 7C:
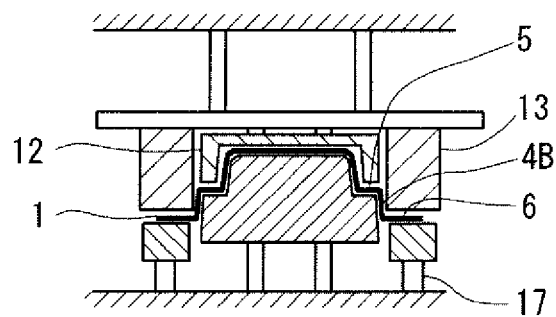
FIG. 7C is a sectional view showing a stage where a downward movement of a second die has been completed (the second die has reached the bottom dead point).

FIGS. 7A to 7C are sectional views schematically showing the hot stamping step in the first embodiment. FIG. 7A shows a stage where the intermediate formed product has been set in the hot stamping machine. FIG. 7B shows a stage where the intermediate formed product has been pinched between the first die and the punch. FIG. 7C shows a stage where a downward movement of the second die has been completed (the second die has reached the bottom dead point).

In reference to FIG. 7A, the heated intermediate formed product 1A is set in the hot stamping machine 10. Specifically, the intermediate formed product 1A is placed on the punch 11. At the time, the punch 11 makes contact with the top board 2, the first vertical wall section 4A, and the flange 6A (the portion of the flange 6A to be formed into the stair 5 of the door inner panel 1, to be exact) of the intermediate formed product 1A. The blank holder 14 is not in contact with the intermediate formed product 1A. Specifically, the blank holder 14 is not in contact with the flange 6A of the intermediate formed product 1A. It is because the initial height of the end surface 14A of the blank holder 14 is lower than the stair surface 11B of the punch 11. Thereafter, the first die 12 and the second die 13 move down as the ram of the machine moves down.

In reference to FIG. 7B, the first die 12 makes contact with the intermediate formed product 1A. Thereby, the top board 2 of the intermediate formed product 1A is pinched between the die bottom surface 12A of the first die 12 and the end surface 11A of the punch 11. At the same time, the end surface 12B of the first die 12 and the stair surface 11B of the punch 11 pinch the flange 6A of the intermediate formed product 1A therebetween. The portion of the flange 6A of the intermediate formed product 1A pinched between the end surface 12B of the first die 12 and the stair surface 11B of the punch 11 is the portion to be formed into the stair 5 of the door inner panel 1 (see FIG. 7C). Then, the top board 2 of the door inner panel 1 shown in FIG. 1 is formed with the die bottom surface 12A of the first die 12 and the end surface 11A of the punch 11. The stair 5 of the panel-like formed product 1 shown in FIG. 1 is formed with the end surface 12B of the first die 12 and the stair surface 11B of the punch 11.

Almost at the same time as the first die 12 making contact with the intermediate formed product 1A, the second die 13 makes contact with the intermediate formed product 1A. As the ram moves down continuously, the second die 13 moves further down. Thereby, the flange 6A of the intermediate formed product 1A is pushed down. In other words, when the second die 13 makes contact with the intermediate formed product 1A, it is actually the start of forming. As the second die 13 moves further down, the flange 6A of the intermediate formed product 1A is pushed to make contact with the blank holder 14, and the reference surface 13A of the second die 13 and the blank holder 14 pinch the flange 6A therebetween. Thus, the blank holder 14 does not make contact with the intermediate formed product 1A until the first and the second dies 12 and 13 make contact with the intermediate formed product 1A. In other words, after the first and the second dies 12 and 13 make contact with the intermediate formed product 1A (for example, when the second die 13 moves down by 1 to 5 mm after the start of forming), the blank holder 14 makes contact with the intermediate formed product 1A. The portion of the flange 6A of the intermediate formed product 1A pinched between the reference surface 13A of the second die 13 and the end surface 14A of the blank holder 14 is a portion to be formed into the second vertical wall section 4B and the flange 6B of the door inner panel 1 (see FIG. 7C).

While the flange 6A is pinched between the second die 13 and the blank holder 14, the gap between the reference surface 13A of the second die 13 and the end surface 14A of the blank holder 14 is preferably kept at the plate thickness of the intermediate formed product 1A plus about 0.1 mm (for example, 0.05 to 0.3 mm). This can be realized in the following structure, for example. A spacer (not shown) is attached to the edge of the end surface 14A of the blank holder 14. The spacer has a thickness of the plate thickness of the intermediate formed product 1A plus about 0.1 mm (for example, 0.05 to 0.3 mm), and the spacer contacts the edge of the reference surface 13A of the second die 13. In this structure, the intermediate formed product 1A is pinched between the second die 13 and the blank holder 14 loosely.

As shown in FIG. 7C, the second die 13 moves down to the bottom dead point. Thereby, the stair 5, the second vertical wall section 4B and the flange 6 of the door inner panel 1 are formed. Then, the door inner panel 1 is formed. At this time, the top board 2 of the intermediate formed product 1A is caught between the first die 12 and the punch 11. Also, the flange 6A of the intermediate formed product 1A is caught between the second die 13 and the blank holder 14. Thereby, occurrence of wrinkles in and around the stair 5 of the door inner panel 1 can be suppressed. The description below will focus on this point.

[Suppression of Cracks and Wrinkles]

Figure 8:
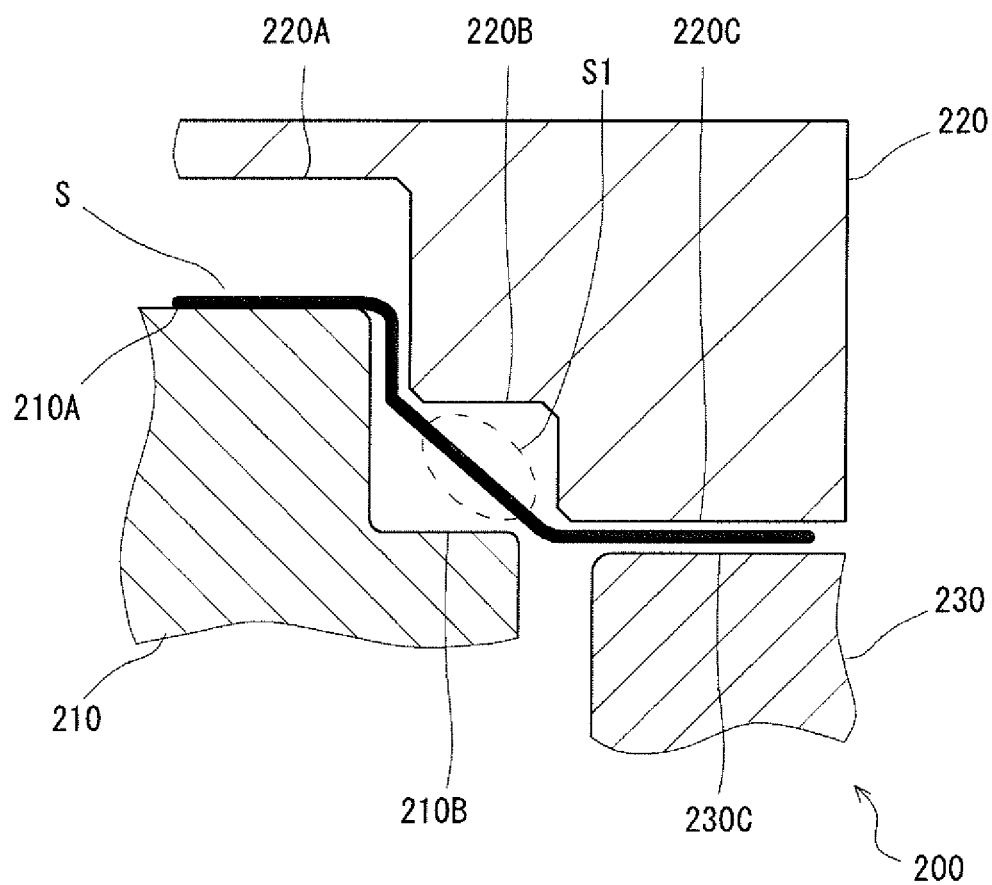
FIG. 8 is a sectional view showing press working by use of a conventional hot stamping machine.

FIG. 8 is a sectional view showing a state in the middle of press working by use of a conventional hot stamping machine. FIG. 8 is an enlarged view of the conventional hot stamping machine 200 showing a portion around a stair surface of a die 220. As shown in FIG. 8, in the hot stamping machine 200, the die 220 includes a stair surface 220E and a reference surface 220C which are integrated with each other. Accordingly, before a die bottom surface 220A and the stair surface 220B reach an end surface 210A and a stair surface 210B of a punch 210, the reference surface 220C of the die 220 reaches an end surface 230C of a blank holder 230. At the time, a portion S1 of a blank S which is to be pushed onto the stair surface 220B of the die 220 is not caught. In other words, the part S1 of the blank S is in contact with neither the punch 210 nor the die 220.

During hot stamping, a blank is cooled by contact with a punch, a die and the like. In the case shown in FIG. 8, the portion S1 of the blank S is cooled late for the reason as described above. Specifically, the portion S1 of the blank S is cooled when the die 220 moves further down from the position shown in FIG. 8. Thus, when the blank S is formed into a door inner panel with a stair in vertical walls by use of the die 220, the portion S1 of the blank S is cooled later than the other portions.

Late cooling of a part of the blank S may cause strength and ductility variations in the blank S. In this case, a formed door inner panel is likely to have cracks, wrinkles and the like. When the formed door inner panel 1 has a stair 5 extending through adjacent vertical walls 4 as shown in FIG. 1, the door inner panel 1 is more likely to have cracks, wrinkles and the like. When the formed door inner panel 1 has high strength, the door inner panel 1 is still more likely to have cracks, wrinkles and the like. Wrinkles are likely to occur especially in the portion S1 of the blank S because the portion S1 is not caught in the die (in the punch 210 or the die 220).

In the door inner panel manufacturing method according to the present invention, on the other hand, press working is divided into two steps. In the hot stamping step, which is the second step of the forming of a door inner panel, two dies are used. Specifically, in the hot stamping step, while the top board, the first vertical wall section and the flange 6A (corresponding to the portion S1 in FIG. 8) of the intermediate formed product 1A are caught between the first die 12 and the punch 11, the stair 5, the second vertical wall section and the flange 6 are formed. Therefore, even in forming a panel-like product with a difficult-to-form shape, it is possible to suppress occurrences of cracks, wrinkles and the like in and around a stair of the panel-like product.

In the first embodiment, the second die 13 is moved down, and thereby, the stair 5 is formed. Instead of moving down the second die 13, it is possible to move up the punch 11. In sum, what is required is to move the second die 13 and the blank holder 14 relative to the first die 12 and the punch 11.

The top board of the door inner panel to be manufactured by the method according to the first embodiment may include a projection or a recess. The projection or recess reinforces the door inner panel. The projection or recess may be formed in the intermediate pressing step or in the hot stamping step. In terms of strength, the recess or the projection preferably has a great or height. However, if the depth of the recess or the height of the projection is too great, cracks are likely to occur around the recess or the projection. In connection with the following embodiments, ways of forming such a recess or projection will also be described.

Second Embodiment

[Formed Product]

Figure 9:
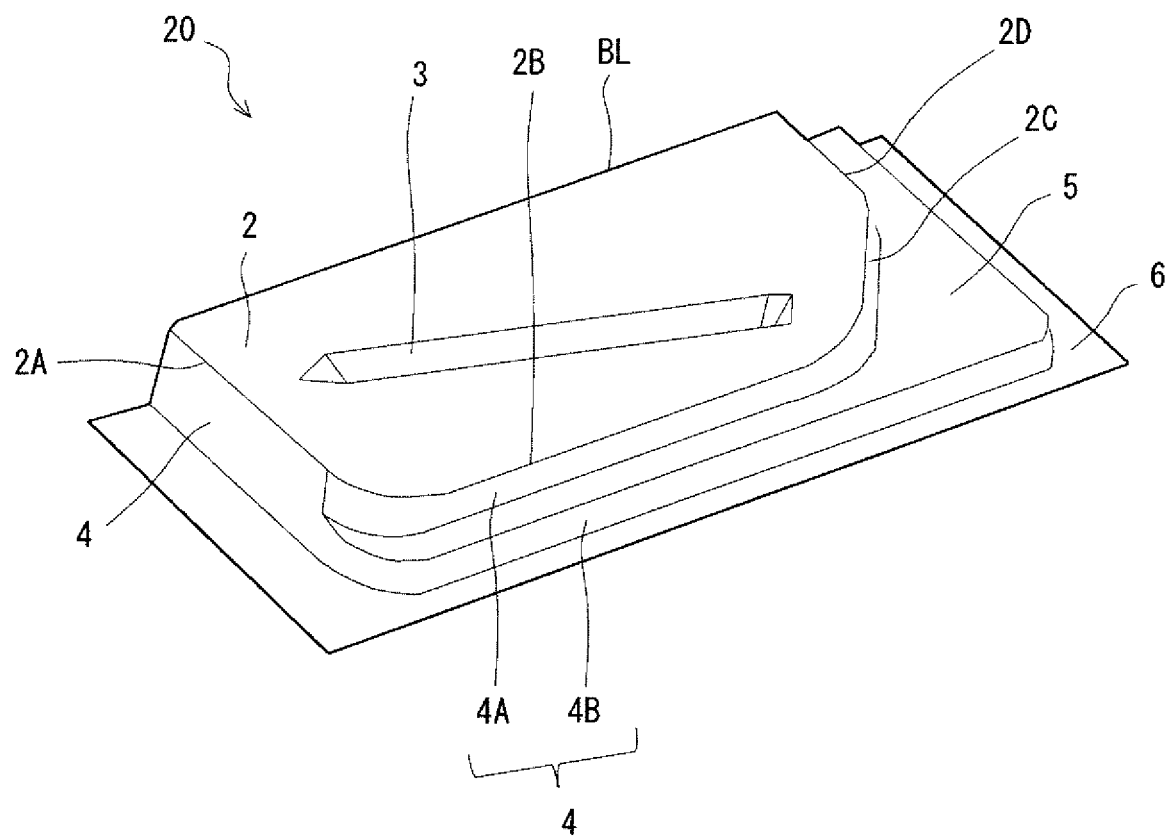
FIG. 9 is a schematic perspective view of a door inner panel produced by a manufacturing method according to a second embodiment.

FIG. 9 is a perspective view schematically showing a door inner panel manufactured by a manufacturing method according to a second embodiment. The method according to the second embodiment is to produce a door inner panel 20 that is similar to the door inner panel 1 according to the first embodiment and further includes a recess 3 in the top board 2. As mentioned above, if the depth of the recess is too deep (great), cracks are likely to occur around the recess. Usually, such a deep recess is formed step by step through more than one process. The second embodiment is directed to the forming of such a deep recess.

For example, the recess 3 is formed along the side of the top board 2 defining the upper edge (belt line) BL of the vehicle body. In this case, the recess 3 functions as a belt line reinforcement to reinforce the belt line. Alternatively, the recess 3 may be formed in the center of the top board 2, for example. In this case, the recess 3 functions as a door impact beam to reinforce the top board 2.

As described above, in a conventional manufacturing method, a product after press working is likely to have wrinkles on a stair. In order to reduce the risk of causing wrinkles, a door inner panel has been formed from a high-workability (low-strength) steel plate. However, a door inner panel is required to have a high collisional property. For this reason, a reinforcement member, such as a door impact beam or the like, is attached to a door inner panel formed from a high-workability steel plate. The attachment of the reinforcement member causes an increase in the number of process steps and an increase in the material cost.

Forming of a door inner panel by hot stamping allows the formed door inner panel to have a high collisional property. Further, by further forming a projection or a recess on or in the top board during the hot stamping step, it is possible to form a reinforcement member integrally with the door inner panel. Meanwhile, in order to obtain a higher collisional property, the recess or the projection should be formed deeper or higher. However, if a deep recess or a high projection is formed at one step, cracks will be likely to occur around the recess or projection. In order to avoid this problem, the recess or projection should be formed in a plurality of steps (for example, in two steps). However, when the recess or projection is formed in two steps, too great a wrinkle may occur around the recess or projection in the second step.

The manufacturing method according to the second embodiment allows a recess to be formed in the top board in a plurality of steps while suppressing occurrence of wrinkles. Therefore, it is possible to reinforce the top board without attaching a door impact beam or other reinforcement members.

[Manufacturing Method]

Figure 10A:
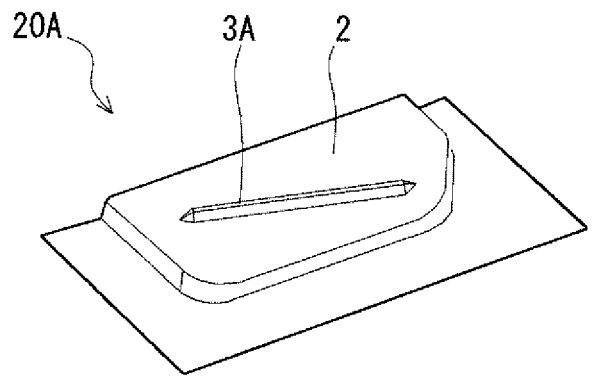
FIG. 10A is a perspective view showing a state after an intermediate pressing step.
Figure 10B:
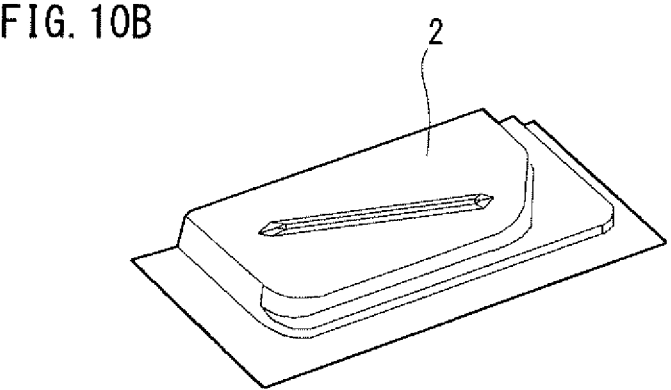
FIG. 10B is a perspective view showing a state during a hot stamping step.
Figure 10C:
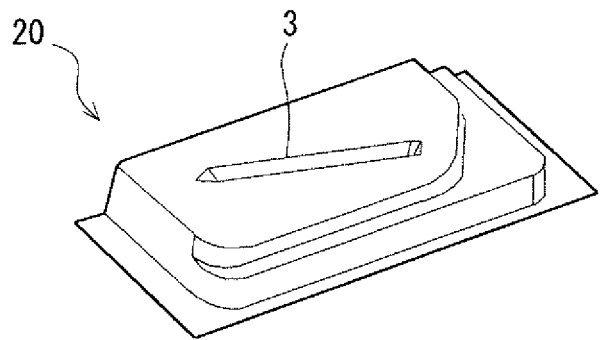
FIG. 10C is a perspective view showing a state after the hot stamping step.

FIGS. 10A to 10C show a process of forming a door inner panel by the method according to the second embodiment. FIG. 10A shows a state after an intermediate pressing step. FIG. 10B shows a state during a hot stamping step. FIG. 10C shows a state after the hot stamping step.

The manufacturing method according to the second embodiment differs from the manufacturing method according to the first embodiment in the following points.

In the intermediate pressing step of producing an intermediate formed product, a raised portion is formed on a top board, at a place corresponding to the location of the recess of the panel-like formed product (door inner panel).

In the hot stamping step, the raised portion of the intermediate formed product is pressed to be formed into the recess of the panel-like formed product (door inner panel).

The steps will hereinafter be described in reference to FIGS. 10A to 10C. The manufacturing method according to the second embodiment includes a preparing step same as that of the first embodiment, and a heating step, which is to be executed after the intermediate pressing step, same as that of the first embodiment. These steps will not be described.

[Intermediate Pressing Step]

In the intermediate pressing step, cold or hot press working is applied to the blank, and thereby, an intermediate formed product is obtained, as in that in the first embodiment. In the second embodiment, a raised portion is formed on the top board of the intermediate formed product.

As shown in FIG. 10A, the intermediate formed product 20A has a raised portion 3A on the top board 2. The raised portion 3A is formed into a recess 3 of a door inner panel 20 in the next hot stamping step (see FIG. 10C). Therefore, the raised portion 3A is disposed at a place where the recess 3 of the door inner panel 20 is to be formed.

It is preferred that the raised portion 3A is gentle and has a greater width than the width of the recess 3 of the door inner panel 20. However, the circumferential length of a cross-section of the raised portion 3A is preferably 0.8 to 1.2 times the circumferential length of a cross-section of the recess 3. This is to prevent occurrence of cracks, wrinkles and the like around the raised portion 3A during the intermediate pressing step. As will be described later, the purpose of forming the raised portion 3A is to prevent a gap between the top board 2 of the intermediate formed product 20A and an end surface 11A of a punch 11 during the hot stamping step.

[Hot Stamping Step]

Figure 11A:
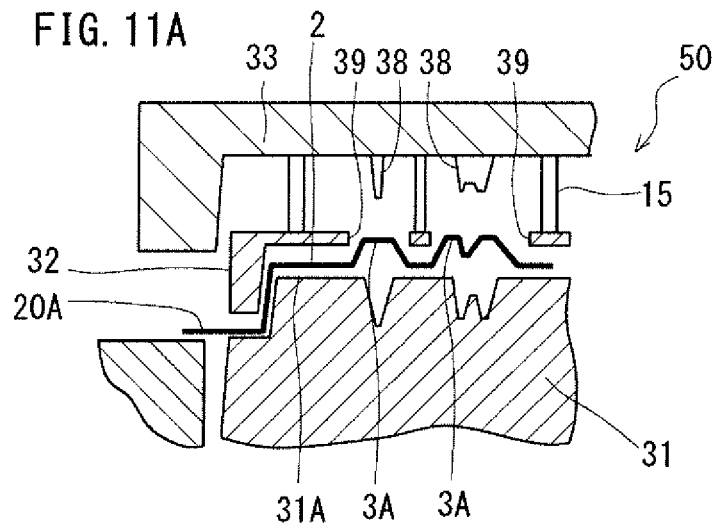
FIG. 11A is a sectional view showing a stage where an intermediate formed product obtained in the second embodiment has been set in a hot stamping machine.
Figure 11B:
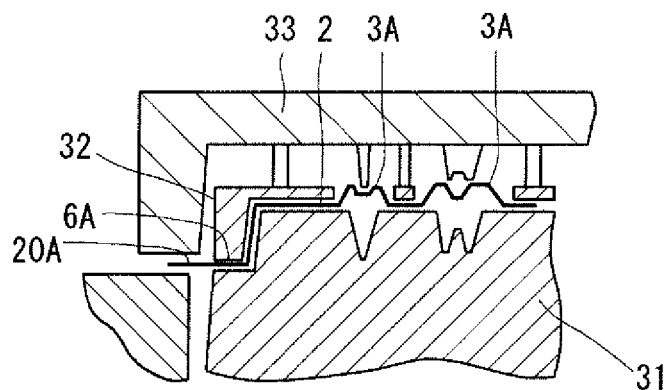
FIG. 11B is a sectional view showing a stage where the intermediate formed product has been pinched between a first die and a punch.
Figure 11C:
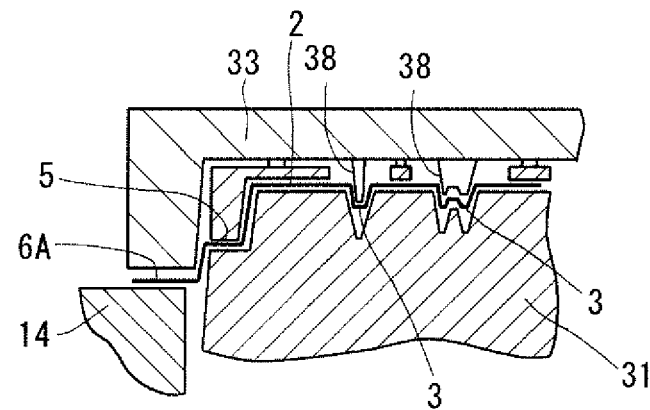
FIG. 11C is a sectional view showing a stage where a downward movement of a second die has been completed (the second die has reached the bottom dead point).

FIGS. 11A to 11C are sectional views schematically showing the hot stamping step in the second embodiment. FIG. 11A shows a stage where the intermediate formed product has been set in a hot stamping machine. FIG. 11B shows a stage where the intermediate formed product has been pinched between a first die and a punch. FIG. 11C shows a stage where a downward movement of a second die has been completed (the second die has reached the bottom dead point). FIGS. 11A to 11C are enlarged views showing the main part of the hot stamping machine.

In reference to FIG. 11A, the hot stamping machine 50 differs from the hot stamping machine 10 in the first embodiment in the following points. The hot stamping machine 50 has no other differences from the hot stamping machine 10 in the first embodiment.

The first die 32 includes an opening 39. The opening 39 is disposed at a place corresponding to the raised portion 3A of the intermediate formed product 20A.

The second die 33 includes a projection 38. The projection 38 is disposed at a place corresponding to the opening 39 of the first die 32 (the raised portion 3A of the intermediate formed product 20A). In the hot stamping step, the projection 38 of the second die 33 penetrates into the opening 39 of the first die 32 from above.

The intermediate formed product 20A is heated and set in the hot stamping machine 50. Specifically, the intermediate formed product 20A is placed on a punch 31. Then, the first die 32 and the second die 33 move down.

As shown in FIG. 11B, first, the first die 32 and the punch 31 pinch the top board 2 of the intermediate formed product 20A therebetween. Thereafter, the second die 33 also moves down, and the projection 38 starts forming the raised portion 3A of the intermediate formed product 20A into a recess. While the projection 38 is forming the recess, the top board 2 is kept pinched between the first die 32 and the punch 31. This is because the first die 32 is connected to the second die 33 via the elastic member 15.

As shown in FIG. 11C, after the second die 33 and the blank holder 14 pinch the flange 6A of the intermediate formed product 20A therebetween, the second die 33 is moved further down, and thereby, the stair 5 is formed. During the forming of the stair 5, as in the first embodiment, the flange 6A is caught between the second die 33 and the blank holder 14. Therefore, the formed product is unlikely to have cracks, wrinkles and the like on the stair 5. Also, while the projection 38 is forming the raised portion 3A into the recess 3, the top board 2 is caught between the first die 32 and the punch 31. This reduces the risk of causing wrinkles around the recess 3 of the formed product. The description below will focus on this point.

[Suppression of Wrinkles Around Recess]

There are problems as follows in a conventional way of forming a recess in a top board of a door inner panel by using a low-workability steel plate as the blank. In forming a deep recess, conventionally, the recess is formed gradually in a plurality of steps for prevention of cracks. However, when press working is applied to an intermediate formed product with a recess, wrinkles may be made around the recess of the intermediate formed product.

Figure 12:
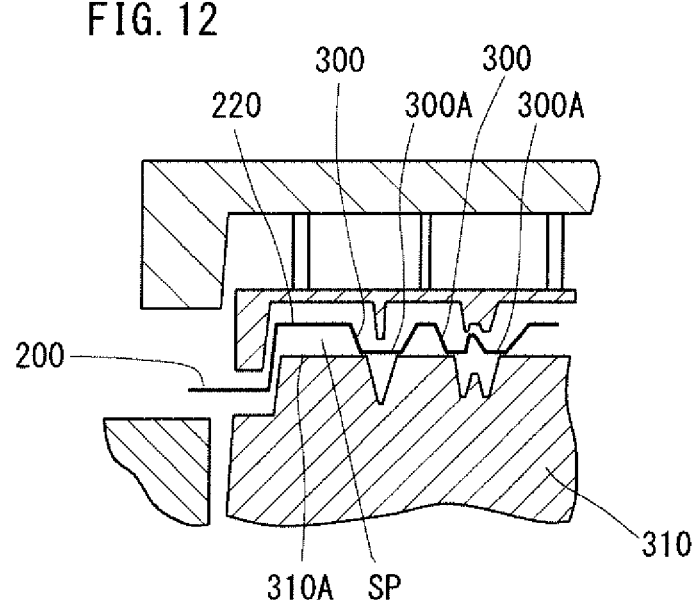
FIG. 12 is a sectional view showing press working by use of a conventional hot stamping machine.

FIG. 12 is a sectional view showing a state during press working by use of a conventional hot stamping machine. When an intermediate formed product 200 with a recess 300 is set in the pressing machine, the bottom surface 300A of the recess 300 makes contact with an end surface 310A of a punch 310. Accordingly, a space SP is made between the top board 220 and the end surface 310A of the punch 310. Because of the space SP, a top board 220 of the intermediate formed product does not contact the end surface 310A of the punch 310. Therefore, during the press working, the blank freely deforms, which is likely to cause wrinkles around the recess 300.

In the manufacturing method according to the second embodiment, on the other hand, before the hot stamping step, an intermediate formed product 20A with a raised portion 3A is produced. When the intermediate formed product 20A with the raised portion 3A is set in a pressing machine, as shown in FIG. 11A, the top board 2 makes contact with the end surface 31A of the punch 31. In other words, there is no gap between the top board 2 and the end surface 31A of the punch 31. This prevents the blank from deforming during the press working and thereby reduces the risk of making wrinkles around the recess 3. During hot stamping, the blank is heated, and therefore, the workability of the blank is increased. Therefore, even though the raised portion 3A is formed into the recess 3, it is unlikely to cause cracks.

Third Embodiment

[Formed Product]

The method according to a third embodiment is to produce a door inner panel that is similar to the door inner panel 1 according to the first embodiment and further includes a projection on the top board 2. The height of the projection of the third embodiment is great as with the depth of the recess of the second embodiment. In short, the door inner panel according to the third embodiment includes a projection instead of the recess 3 of the door inner panel 20 according to the second embodiment. The projection of the door inner panel according to the third embodiment functions the same way as the recess 3 in the second embodiment. In forming the projection of the door inner panel according to the third embodiment, there is a risk of causing wrinkles for the same reason as in the case of forming the recess 3 in the second embodiment. A manufacturing method of a door inner panel with a projection will be described below.

[Manufacturing Method]

The manufacturing method according to the third embodiment differs from the manufacturing method according to the first embodiment in the following points.

In the intermediate pressing step of producing an intermediate formed product, a recessed portion is formed in a top board, at a place corresponding to the location of the projection of the panel-like formed product (door inner panel).

In the hot stamping step, the recessed portion of the intermediate formed product is pressed to be formed into the projection of the panel-like formed product (door inner panel).

Figure 13A:
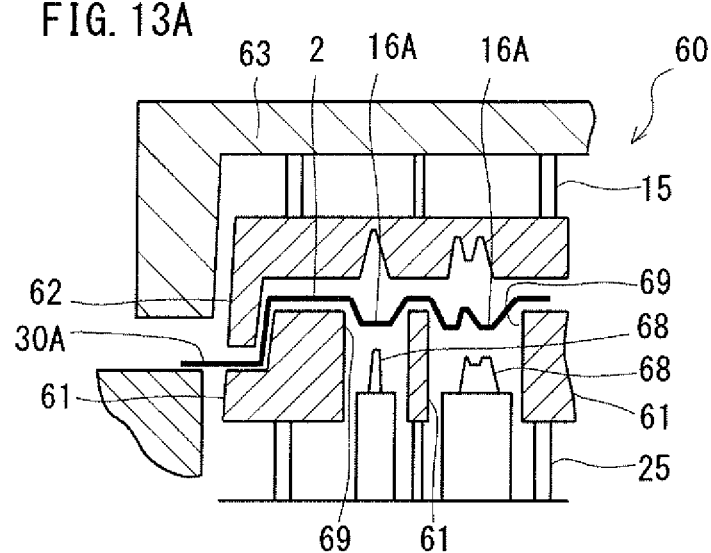
FIG. 13A is a sectional view showing a stage where an intermediate formed product obtained in a third embodiment has been set in a hot stamping machine.
Figure 13B:
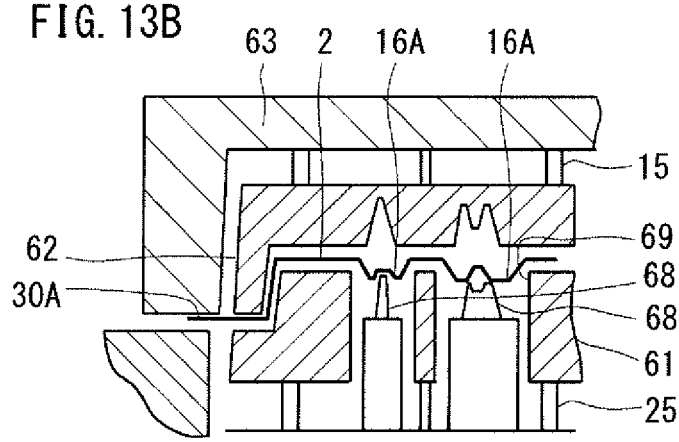
FIG. 13B is a sectional view showing a stage where the intermediate formed product has been pinched between a first die and a punch.
Figure 13C:
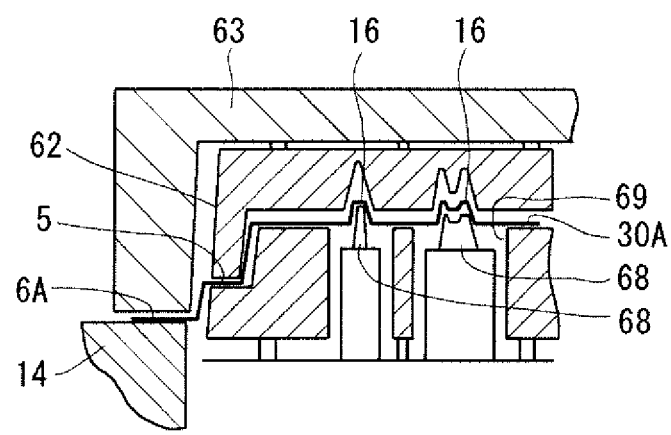
FIG. 13C is a sectional view showing a stage where a downward movement of a second die has been completed (the second die has reached the bottom dead point).

FIGS. 13A to 13C are sectional views schematically showing the hot stamping step in the third embodiment. FIG. 13A shows a stage where the intermediate formed product has been set in a hot stamping machine. FIG. 13B shows a stage where the intermediate formed product has been pinched between a first die and a punch. FIG. 13C shows a stage where a downward movement of a second die has been completed (the second die has reached the bottom dead point). In reference to FIGS. 13A to 13C, the steps will be described below. The manufacturing method according to the third embodiment includes a preparing step same as that of the first embodiment, and a heating step, which is to be executed after the intermediate pressing step, same as that of the first embodiment. These steps will not be described.

[Intermediate Pressing Step]

In the intermediate pressing step, cold or hot press working is applied to the blank, and thereby, an intermediate formed product is obtained, as in that of the first embodiment. In the third embodiment, a recessed portion is formed in the top board of the intermediate formed product.

As shown in FIG. 13A, the intermediate formed product 30A has a recessed portion 16A in the top board 2. The recessed portion 16A is formed into a projection 16 of a door inner panel in the next hot stamping step. Therefore, the recessed portion 16A is disposed at a place where the projection 16 of the door inner panel is to be formed.

[Hot Stamping Step]

As shown in FIG. 13A, the hot stamping machine 60 differs from the hot stamping machine 10 in the first embodiment in the following points. The hot stamping machine 60 has no other differences from the hot stamping machine 10 in the first embodiment.

The punch 61 includes an opening 69 disposed at a place corresponding to the recessed portion 16A of the intermediate formed product 30A, and a projection 68 disposed at a place corresponding to the opening 69. In the hot stamping step, the projection 68 of the punch 61 penetrates into the opening 69 from below.

The intermediate formed product 30A is heated and set in the hot stamping machine 60. Specifically, the intermediate formed product 30A is placed on the punch 61. Then, the first die 62 and the second die 63 move down.

As shown in FIG. 13B, first, the first die 62 and the punch 61 pinch the top board 2 of the intermediate formed product 30A therebetween. Thereafter, the second die 63 further moves down, and the projection 68 starts forming the recessed portion 16A of the intermediate formed product 30A into a projection. While the projection 68 is forming the projection, the top board 2 is kept pinched between the first die 62 and the punch 61. This is because the first die 62 is connected to the second die 63 via the elastic member 15.

In the third embodiment, the punch 61 is supported by the base of the hot stamping machine 60 via an elastic member 25. The projection 68 is fixed on the base of the hot stamping machine 60. Therefore, as the first die 62 and the second die 63 move down, the projection 68 penetrates into the opening 69 of the punch 61.

As shown in FIG. 13C, after the second die 63 and the blank holder 14 pinch the flange 6A of the intermediate formed product 30A therebetween, the second die 63 is moved further down, and thereby, the stair 5 is formed. During the forming of the stair 5, as in the first embodiment, the flange 6A is caught between the second die 63 and the blank holder 14. This reduces the risk of causing cracks, wrinkles and the like on the stair 5. Also, while the projection 68 is forming the recessed portion 16A into the projection 16, the top board 2 is caught between the first die 62 and the punch 61. This reduces the risk of causing wrinkles around the projection 16.

In any of the above embodiments, a door inner panel (a panel-like formed product) is formed by hot stamping. In hot stamping, a blank is quenched while being processed. Specifically, the blank is cooled by contact with a punch or a die holder. This allows production of a high-strength panel-like formed product. The high-strength panel-like formed product is a formed product with a tensile strength of 1200 MPa or more, for example.

In any of the above embodiments, before the first and the second dies make contact with the intermediate formed product, the punch is already in contact with the intermediate formed product, but the blank holder is not in contact with the intermediate formed product. Accordingly, the part of the intermediate formed product in contact with the punch is quenched from the early stage of hot stamping. The part of the intermediate formed product in contact with the punch already has the final shape when the intermediate formed product has been produced. Therefore, even though the part is quenched from the early stage of hot stamping, it would cause no problem in terms of dimensions and quality. However, the flange of the intermediate formed product, which is a part out of contact with the punch, needs to be formed into the stair, the second vertical wall section and the flange of the final product by hot stamping. In any of the above embodiments, since the blank holder is prevented from making contact with the intermediate formed product at the early stage of hot stamping, it is possible to later deform the part to be pinched between the blank holder and the second die. Therefore, this part also would have no problem in terms of dimensions and quality.

In any of the embodiments, the blank may be a tailored blank. Tailored blanks are classified into tailored welded blanks (which will hereinafter be referred to as "TWB") and tailored rolled blanks (which will hereinafter be referred to as "TRB"). A TWB is a blank obtained by welding (for example, butt welding) and integrating different kinds of steel plates which are different in plate thickness, tensile strength and other properties. A TRB is a blank obtained by changing the gap between reduction rolls while producing a steel plate and thereby varying the plate thickness. The use of a tailored blank allows strengthening of only a part desired to have high strength and a decrease in plate thickness. A panel-like formed product produced from a tailored blank can be used as a door inner panel for an automobile. This will lead to an improvement in collisional property and a reduction in weight.

EXAMPLES

In order to confirm the effects of the manufacturing methods according to the embodiments, an analysis was performed by the FEM (finite element method). As an inventive example, the door inner panel 1 shown in FIG. 1 was produced by the manufacturing method according to the first embodiment by use of the pressing machine 40 shown in FIG. 3 and the hot stamping machine 10 shown in FIG. 10. As a comparative example, a door inner panel similar to the inventive example was produced by use of the conventional hot stamping machine 200 shown in FIG. 8. From the results of the analysis, the occurrence of wrinkles was evaluated.

[Analysis Condition]

As a blank, a steel plate containing, at mass %, C: 0.21%, Si: 0.25%, Mn: 1.20%, B: 0.0020% and containing Fe and impurities as the balance was used. The plate thickness of the blank was 1.2 mm. The blank after quenching had the following material characteristics; a Vickers hardness of 448; a yield strength of 448 MPa; a tensile strength of 1501 MPa; and a breaking elongation of 6.4%. The material (an intermediate formed product in the inventive example and a blank in the comparative example) was heated to 750° C. In the hot stamping step, the die was moved at a speed equivalent to 40 m/s. In the hot stamping step, the coefficient of friction between the die and the material was 0.4. A temperature-forming interaction analysis was performed by use of general-purpose FEM analysis software (LS-DYNA (tradename) manufactured by LIVER MORE SOFTWARE TECHNOLOGY).

Each of the door inner panels had the following dimensions.

Entire length (including a flange): 950 mm
Entire width (including a flange): 670 mm
Entire length of the top board: 830 mm
Entire width of the top board: 600 mm
Height of the first vertical wall section: 40 mm
Height of the second vertical wall section: 40 mm
Minimum width of the stair: 40 mm In the hot stamping step in the inventive example, the end surface of the blank holder was initially at a height 3.0 mm lower than the height of the stair surface of the punch. In this case, when the second die moved down by 3.0 mm after the first die and the second die had made contact with the intermediate formed product, the blank holder and the intermediate formed product made contact with each other.

[Evaluation Method]

About each of the produced door inner panels, the curvature of a concavity or a convexity on the surface of the stair was examined. The curvature was calculated as follows.

$$\text{(Curvature } [1/m]) = (1/(\text{radius of curvature})) \quad (1)$$

Sections of each of the door inner panels along a direction perpendicular to the surface of the stair were obtained. In each of the sections, the curvature radii of concavities and convexities on the surface of the stair were calculated, and the minimum value among the curvature radii was adopted as the radius of curvature in the formula (1). Then, when the curvature was equal to or more than 0.01, it was determined to be a wrinkle.

[Analysis Results]

In the inventive example, there were no sections in which the curvature was 0.01 or more. Accordingly, the inventive example was evaluated as having no wrinkles. In the comparative example, on the other hand, there were many sections in which the curvature was 0.01 or more. Accordingly, the comparative example was evaluated as having wrinkles.

Some embodiments of the present invention have been described above. However, the above-described embodiments are merely examples to show how to carry out the present invention. Therefore, the present invention should not be limited to the embodiments above, and it is possible to modify the embodiments appropriately without departing from the spirit and scope of the present invention.

REFERENCE SIGNS LIST 1, 20: panel-like formed product (door inner panel)
1A, 20A, 30A: intermediate formed product
2: top board
3: recess
3A: raised portion
4, 4A, 4B: vertical wall
5: stair
10, 50, 60, 200: hot stamping machine
11, 31, 61, 210: punch
12, 32, 62: first die
13, 33, 63: second die
38, 68: projection
39, 69: opening
14, 230: blank holder
16: projection
16A: recessed portion
S: blank
40: pressing machine
41: punch
42: die
43: blank holder
45: blank
46: heating furnace (heating device)

The invention claimed is:

1. A method for manufacturing a panel-like formed product including a polygonal top board, and two or more vertical walls extending from two or more sides of the top board, the vertical walls including at least two adjacent vertical walls extending from at least two adjacent sides of the top board, wherein two or more adjacent ones of the vertical walls are divided by a stair extending therethrough into a first vertical wall section connecting an inner edge of the stair and the top board, and a second vertical wall section connecting an outer edge of the stair" has been replaced with "including a polygonal top board and vertical walls that extend from the sides of the top board, wherein the vertical walls include at least two adjacent vertical walls extending from at least two adjacent sides of the top board wherein the at least two adjacent vertical walls are divided by a stair into a first vertical wall section connecting an inner edge of the stair and the top board, and a second vertical wall section connected to an outer edge of the stair", the method comprising:
a preparing step of preparing a steel plate as a blank;
an intermediate pressing step of applying cold or hot press working to the blank and thereby producing an intermediate formed product wherein the top board has been formed, and the first vertical wall section of the vertical walls has been formed to a height of the stair;
a heating step of heating the intermediate formed product; and
a hot stamping step of applying press working to the heated intermediate formed product by use of a hot stamping machine and thereby producing the panel-like formed product, wherein:
the hot stamping machine includes:
a first die having an engraved portion corresponding to a shape of the top board and a shape of a portion from the top board to the outer edge of the stair;

a second die disposed outside the first die;

a punch facing the first die and having an engraved portion corresponding to the shape of the top board and the shape of the portion from the top board to the outer edge of the stair; and a blank holder facing the second die; and the hot stamping step includes:

a first step of placing the intermediate formed product on the punch, pinching the intermediate formed product between the first die and the punch, and pinching the intermediate formed product between the second die and the blank holder; and a second step of moving the second die and the blank holder relative to the first die and the punch while keeping the intermediate formed product pinched between the first die and the punch, and thereby producing the panel-like formed product;

wherein in the first step, the blank holder does not make contact with the intermediate formed product until the first and the second dies make contact with the intermediate formed product.

2. The method for manufacturing a panel-like formed product according to claim 1, wherein in the first step, an end surface of the blank holder is initially located at a height lower than a stair surface of the punch corresponding to the stair.

3. The method for manufacturing a panel-like formed product according to claim 1, wherein:

the panel-like formed product has a recess in the top board;

in the intermediate pressing step, a raised portion is formed on the top board of the intermediate formed product, at a place corresponding to a location of the recess of the top board of the panel-like formed product;

the first die of the hot stamping machine has an opening at a place corresponding to the raised portion of the intermediate formed product;

the second die of the hot stamping machine has a projection at a place corresponding to the opening of the first die; and in the second step of the hot stamping step, the raised portion of the intermediate formed product is pressed by the projection and thereby formed into the recess of the panel-like formed product.

4. The method for manufacturing a panel-like formed product according to claim 1, wherein:

the panel-like formed product has a projection on the top board;

in the intermediate pressing step, a recessed portion is formed in the top board of the intermediate formed product, at a place corresponding to a location of the projection of the top board of the panel-like formed product;

the punch of the hot stamping machine has an opening at a place corresponding to the recessed portion of the intermediate formed product, and a projection at a place corresponding to the opening; and in the second step of the hot stamping step, the recessed portion of the intermediate formed product is pressed by the projection and thereby formed into the projection of the panel-like formed product.

5. The method for manufacturing a panel-like formed product according to claim 1, wherein the panel-like formed product after the hot stamping step has a tensile strength of 1200 MPa or more.

6. The method for manufacturing a panel-like formed product according to claim 1, wherein the blank is a tailored blank.

* * * * *